US00RE42484E

(19) United States
(12) Reissued Patent
Kitamura et al.

(10) Patent Number: US RE42,484 E
(45) Date of Reissued Patent: Jun. 28, 2011

(54) DRINK CONTAINER

(75) Inventors: Nobuyuki Kitamura, Kyoto (JP); Shigetaka Kanai, Kyoto (JP); Keiko Fukuda, Kyoto (JP)

(73) Assignees: Thermos K.K., Niigata-ken (JP); Thermos Limited Liability Company, Rolling Meadows, IL (US)

() Term: 14 Years**

(21) Appl. No.: 29/364,805

(22) Filed: Jun. 29, 2010

Related U.S. Patent Documents

Reissue of:
(64) Patent No.: Des. 590,661
Issued: Apr. 21, 2009
Appl. No.: 29/323,320
Filed: Aug. 22, 2008

(30) Foreign Application Priority Data

Mar. 19, 2008 (JP) ..... 2008-006793

(51) LOC (9) Cl. ..... 07-01
(52) U.S. Cl. ..... D7/510; D7/511
(58) Field of Classification Search ..... D7/317, D7/316, 523, 510, 511, 412, 376, 608; D9/551, D9/529; 220/674, 715, 713, 718, 592.16, 220/592.17, 709, 708; 215/12.1, 382, 388, 215/387
See application file for complete search history.

(56) References Cited

U.S. PATENT DOCUMENTS

| | | | | | |
|---|---|---|---|---|---|
| D455,611 | S | * | 4/2002 | Kitamura et al. | D7/608 |
| D505,831 | S | * | 6/2005 | Liu | D7/510 |
| D523,692 | S | * | 6/2006 | Meehan | D7/507 |
| D528,862 | S | * | 9/2006 | Li | D7/510 |
| D529,339 | S | * | 10/2006 | Carreno et al. | D7/511 |
| D538,110 | S | * | 3/2007 | Kitamura et al. | D7/608 |
| D539,607 | S | * | 4/2007 | Lapsker | D7/510 |
| D540,119 | S | * | 4/2007 | Lapsker | D7/510 |
| D548,008 | S | * | 8/2007 | Lin | D7/511 |
| D560,435 | S | * | 1/2008 | Meehan | D7/510 |
| D564,841 | S | * | 3/2008 | Clemens et al. | D7/510 |
| D572,531 | S | * | 7/2008 | Romandy et al. | D7/510 |

* cited by examiner

*Primary Examiner* — Marianne Pandozzi
(74) *Attorney, Agent, or Firm* — Boyle Fredrickson, S.C.

(57) CLAIM

The ornamental design for a drink container, as shown and described.

DESCRIPTION

FIG. 1 is a front perspective view of a drink container, showing our new design;
FIG. 2 is a rear perspective view thereof;
FIG. 3 is a front view thereof;
FIG. 4 is a rear view thereof;
FIG. 5 is a top plan view thereof;
FIG. 6 is a bottom view thereof; and,
FIG. 7 is a left [sight] *side* view thereof.

1 Claim, 6 Drawing Sheets

Figure 1:
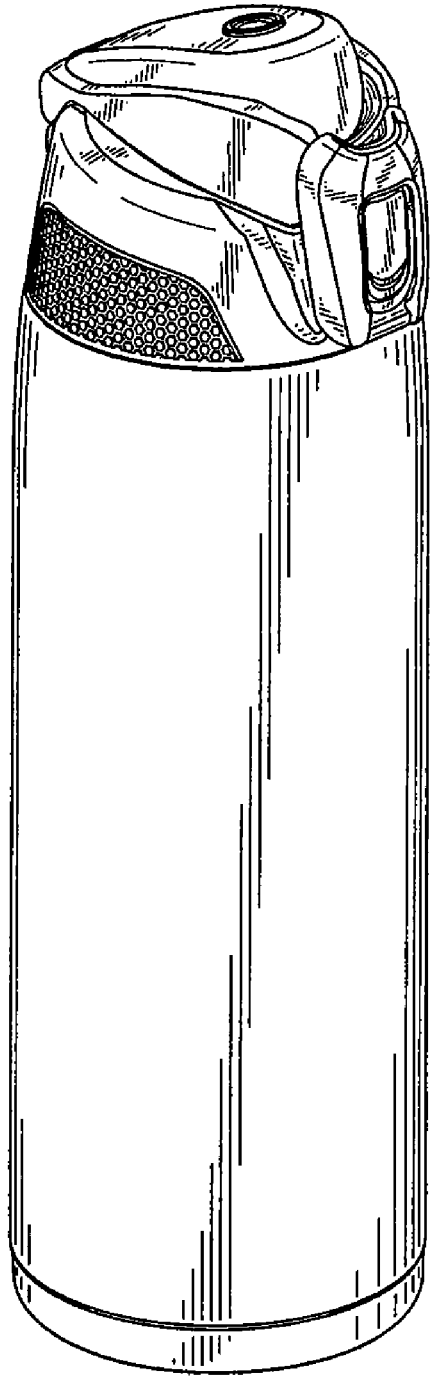
Figure 2:
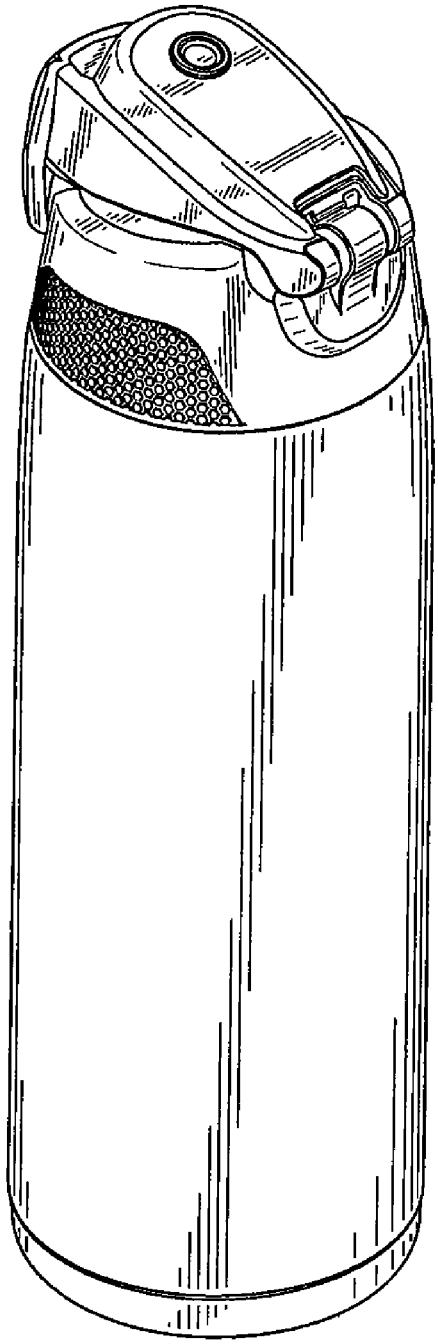
Figure 3:
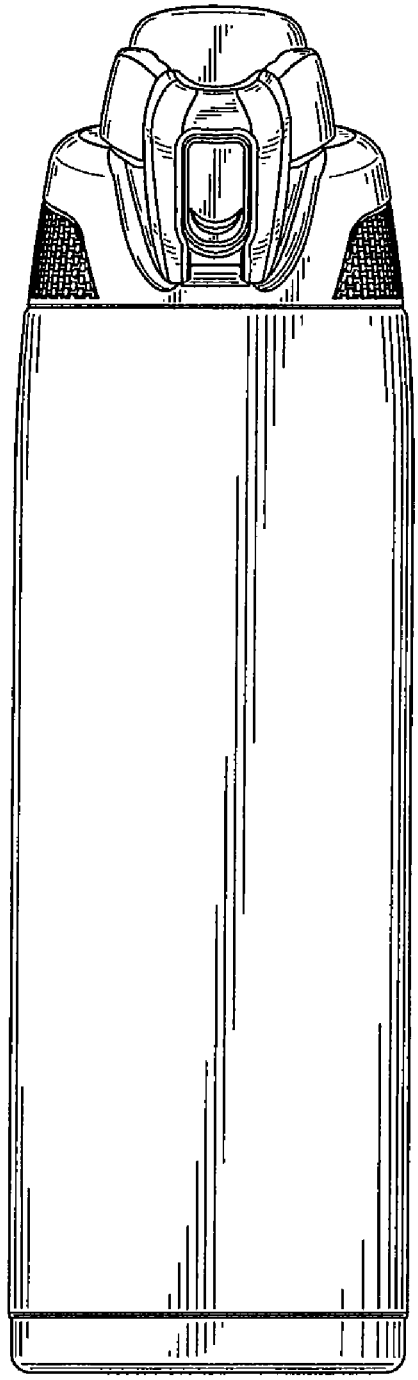
Figure 4:
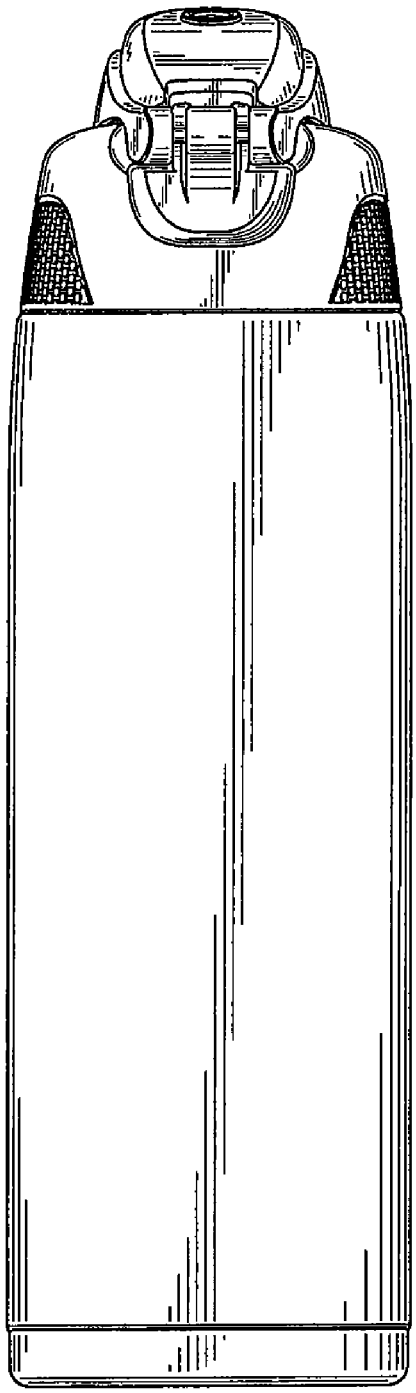
Figure 5:
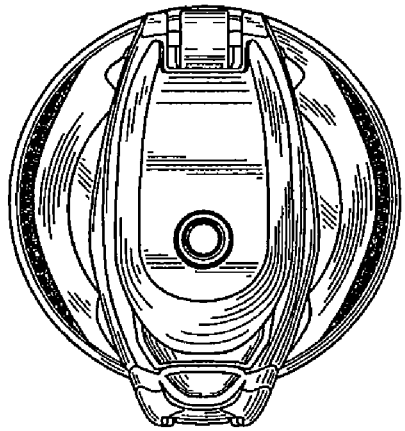
Figure 6:
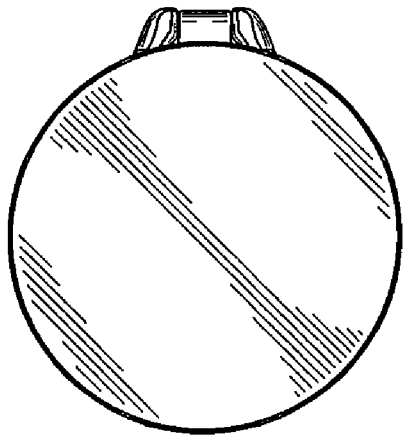
Figure 7:
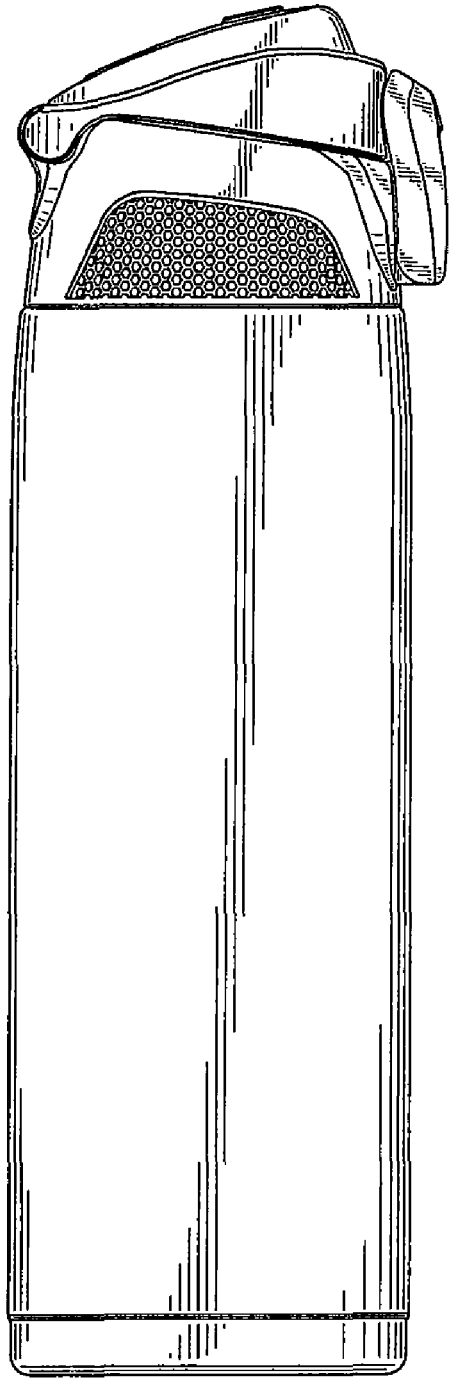

Matter enclosed in heavy brackets [ ] appears in the original patent, but forms no part of this reissue; matter printed in italics indicates the additions made by reissue.